(12) United States Patent
Oldani

(10) Patent No.: US 10,442,362 B2
(45) Date of Patent: Oct. 15, 2019

(54) AUTOMOTIVE STORAGE COMPARTMENT

(71) Applicant: FORD GLOBAL TECHNOLOGIES, LLC, Dearborn, MI (US)

(72) Inventor: Raymond Anthony Oldani, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 474 days.

(21) Appl. No.: 14/957,086

(22) Filed: Dec. 2, 2015

(65) Prior Publication Data

US 2017/0158142 A1 Jun. 8, 2017

(51) Int. Cl.
*B60R 7/06* (2006.01)
(52) U.S. Cl.
CPC .................... *B60R 7/06* (2013.01)
(58) Field of Classification Search
CPC .......................................... B60R 7/06
USPC ...................................... 296/37.12
See application file for complete search history.

(56) References Cited

U.S. PATENT DOCUMENTS

| | | | |
|---|---|---|---|
| 4,630,857 A | 12/1986 | Zweiniger et al. | |
| 5,385,378 A | 1/1995 | Hakamada et al. | |
| 5,558,385 A | 9/1996 | Gross et al. | |
| 5,845,954 A | 12/1998 | Depue | |
| 6,176,534 B1 | 1/2001 | Duncan | |
| 7,980,416 B2 | 7/2011 | Chou et al. | |
| 2004/0262937 A1 | 12/2004 | Peck, Jr. et al. | |
| 2006/0060620 A1 | 3/2006 | Schmidt et al. | |
| 2009/0295183 A1* | 12/2009 | Piekny | B60R 7/06 296/37.1 |
| 2010/0148531 A1 | 6/2010 | Evans et al. | |
| 2016/0272122 A1* | 9/2016 | Dunham | B60R 7/06 |
| 2016/0297368 A1* | 10/2016 | Huebner | B60R 7/06 |

FOREIGN PATENT DOCUMENTS

| | | | | |
|---|---|---|---|---|
| DE | 202016101213 U1 * | 4/2016 | | B60R 7/06 |
| DE | 202016101714 U1 * | 5/2016 | | B60R 7/06 |
| JP | 2005262943 A | 9/2005 | | |

OTHER PUBLICATIONS

English machine translation of 2005232943JPA.

* cited by examiner

*Primary Examiner* — Hilary L Gutman
(74) *Attorney, Agent, or Firm* — Vichit Chea; King & Schickli PLLC

(57) ABSTRACT

A vehicle storage compartment assembly includes a housing and a pivoting door. A floating storage bin is pivotally connected to each of the housing and the pivoting door whereby on translation of the door to an open configuration the storage bin deploys forwardly from an interior of the housing.

6 Claims, 7 Drawing Sheets

AUTOMOTIVE STORAGE COMPARTMENT

TECHNICAL FIELD

This disclosure relates generally to motor vehicles, and more particularly to an improved glove box for a motor vehicle.

BACKGROUND

Storage space in the modern motor vehicle is at a premium. As an example, with reference to FIG. 1 only a finite amount of space can be devoted to a conventional vehicle V glove box or glove compartment 10 (or indeed any other storage compartment conventionally or conveniently disposed on or in a vehicle dash panel 12). This is because of the tight packaging restrictions imposed in order to accommodate other necessary and desired safety and/or comfort components typically disposed in, on, or near the vehicle dash panel. Non-limiting examples of such components include air bags (not shown), audio systems (not shown), speakers (not shown), center consoles 14, HVAC registers 16 and ductwork (not shown), audio system controller/information center/navigation system control panels (shown generally as ref. num. 18), etc.

Using the example of a dash panel-mounted glove box 10, in view of the many components which must be packaged in the dash it may not be possible to increase storage volume by altering the glove box dimensions to provide a deeper or wider storage space because of lack of room to expand the glove box rearwardly or to the side. Moreover, often increasing glove box storage volume by increasing the glove box dimensions creates a conflict with a design requirement imposed on vehicle manufacturers for aesthetically pleasing interior styling and bolster features, which also tend to distance the glove box position in the dash panel from the vehicle operator.

One prior art solution to the above-summarized problem is to provide a bin fixedly attached to a glove box door. This is illustrated in FIG. 2. As shown, a storage compartment assembly 200 is provided including a housing 202 configured for attachment to a vehicle component such as a dash panel (not shown). A pivoting door 204 is provided, in the depicted embodiment being hingedly connected to the housing 202 by a hinge assembly 206 whereby the door may be translated between a closed configuration and the open configuration shown in the drawing (see arrow). A storage area is provided by a storage bin 208 dimensioned to be received in an interior of the housing 202. At least a portion of the storage bin 208 is fixedly attached to an interior surface 210 of the door 204. This may be by any suitable attachment means, including without intending any limitation fasteners, adhesives, welding, fabricating the door and storage bin as a single molded piece, etc. As shown, pivoting the door 204 to the open configuration (see arrow) deploys the storage bin 208 for use.

However, as can be seen from the drawing, this mechanism causes the storage bin 208 to deploy by pivoting about a substantially fixed pivot point 201 whereby a forward end 203 of the bin deploys downwardly and a rearward end 205 of the bin deploys upwardly (see arrows). While this configuration makes the storage bin 208 available to a user, it also limits the accessibility of the storage bin 208 interior to a user positioned in the vehicle passenger cabin at a distance from the storage bin, for example the vehicle driver. Moreover, the downward deployment of the storage bin 208 creates an angled orientation of the deployed storage bin as shown, increasing the risk of inadvertent dislodgment of items I contained therein.

Accordingly, a need is identified in the art for a vehicle storage compartment such as a glove box which increases user accessibility even when disposed in a dash panel or other portion of a vehicle that is distanced from the vehicle operator, and further which does not unduly limit accessible storage compartment volume. To solve this and other problems, the present disclosure relates to a vehicle storage compartment assembly such as a dash panel-mounted glove box. Advantageously, the disclosed storage compartment includes a floating interior bin configured to translate outwardly on deployment of a storage compartment door, to improve user accessibility without reducing storage compartment volume. By the described storage compartment assembly, user utility and convenience is maximized.

SUMMARY

In accordance with the purposes and benefits described herein, a vehicle storage compartment assembly is described, comprising a housing and a pivoting door. The storage compartment assembly may comprise a glove box or a different type of storage compartment. A floating storage bin is pivotally connected to each of the housing and the pivoting door. The floating storage bin feature is provided by a linkage arrangement pivotally connected at a first end to the housing and at an opposed end to the storage bin. A link arm arrangement fixedly attached at a first end to the pivoting door and pivotally connected at a second end to the storage bin operatively links deployment of the floating storage bin to the pivoting door.

In embodiments, the linkage arrangement includes a pair of linkages each pivotally connected at a first end to the housing and at an opposed end to the storage bin. The link arm arrangement includes a pair of link arms each fixedly attached at a first end to the pivoting door and each pivotally connected at a second end to the storage bin. By inclusion of the pivotally connected linkages, a tendency of the storage bin to assume a forward tilt on deployment by opening the pivoting door is reduced.

In the following description, there are shown and described embodiments of the disclosed storage compartment assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed storage compartment assembly, and together with the description serve to explain certain principles thereof. In the drawing.

Reference will now be made in detail to embodiments of the disclosed storage compartment assembly, examples of which are illustrated in the accompanying drawing figures.

DETAILED DESCRIPTION

The present disclosure provides a storage compartment for a vehicle including a floating storage bin. Preliminarily, while the disclosure describes the storage compartment in the context of a vehicle glove box configured for disposition in a dash panel, it will readily be appreciated by the skilled artisan that the described structures may be modified for disposition in association with other vehicle structures such as center consoles, rear consoles, seat armrests, door panels, and others. Therefore, the descriptions will not be taken as limiting.

Figure 3:
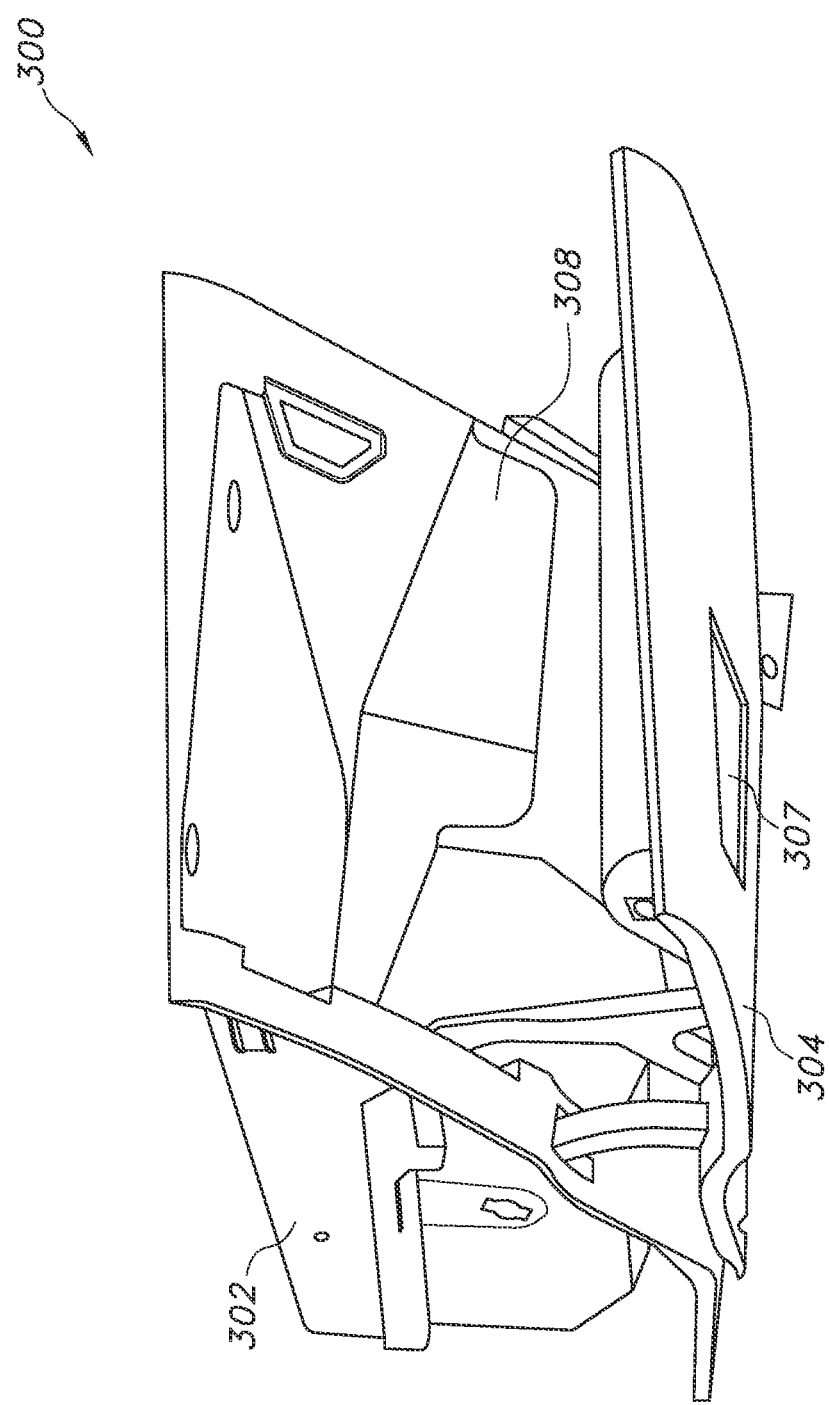
FIG. 3 shows a storage compartment according to the present disclosure.
Figure 4:
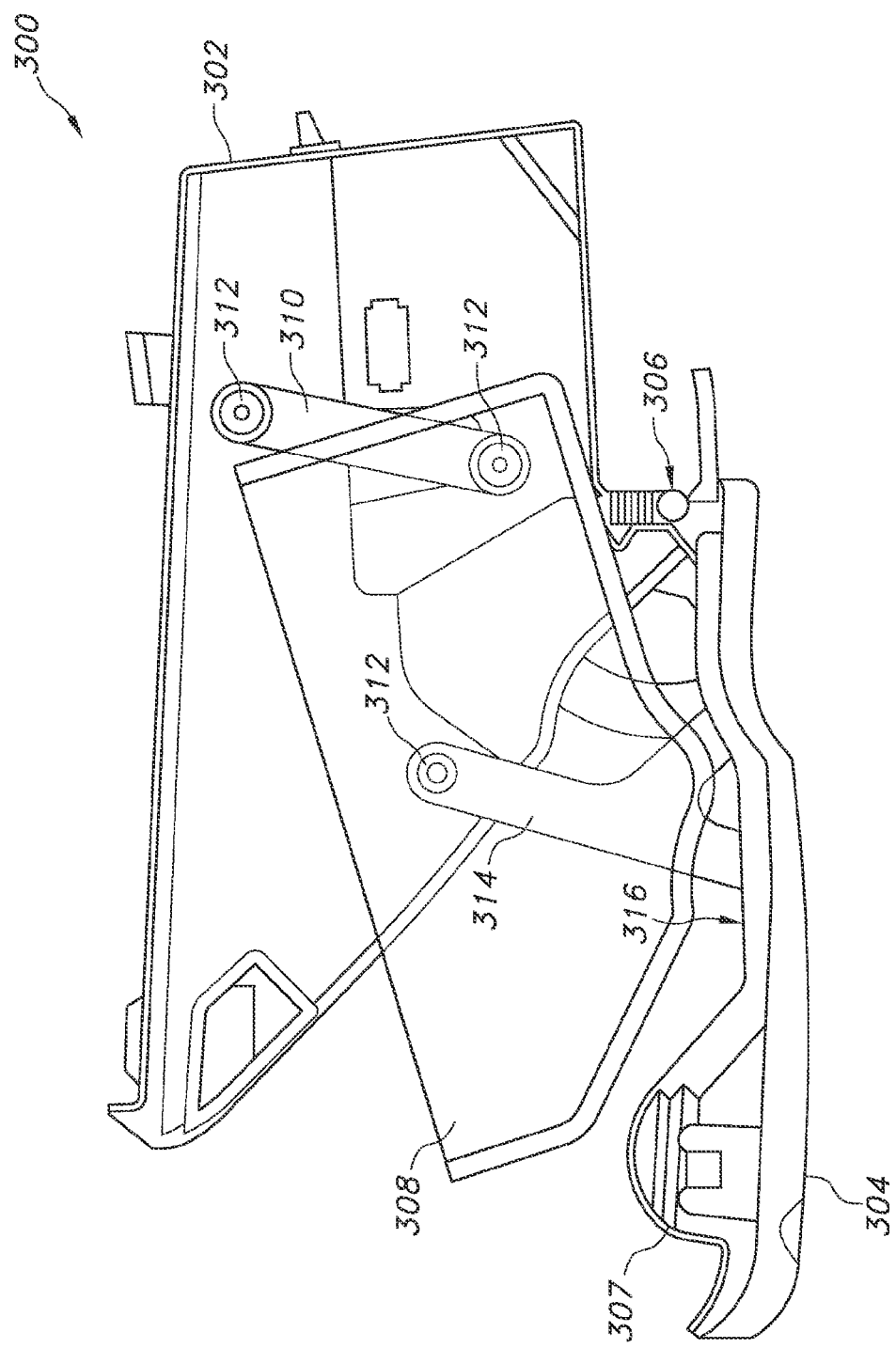
FIG. 4 shows a sectional side view of the storage compartment of FIG. 3.

With reference to FIG. 3, a storage compartment assembly 300 according to the present disclosure includes a housing 302 configured for attachment to a vehicle component such as a dash panel (not shown). A pivoting door 304 is provided, in the depicted embodiment being hingedly connected to the housing 302 by a hinge assembly 306 (not visible in this view) whereby the door may be translated between a closed configuration and the open configuration shown in the drawing (see arrow). A number of suitable hinge mechanisms as are known in the art are contemplated for use. The pivoting door 304 may include a latching/locking mechanism 307 for securing the door in a closed configuration. A number of designs of suitable latching/locking mechanisms are known to the skilled artisan, and any such designs are contemplated for use herein.

A storage area is provided by a floating storage bin 308 dimensioned to be received in an interior of the housing 302. As will be appreciated, by the term floating it is meant that the storage bin 308 is not fixedly or rigidly attached to any element of the storage compartment assembly 300. Instead, the storage bin 308 is pivotally connected to each of the housing 302 and the pivoting door 304. This is accomplished in an embodiment by way of linkages that will now be described.

As shown in the drawing figure, the assembly 300 includes a linkage arrangement comprising at least one linkage 310 that is pivotally connected at a first end to a portion of the storage bin 308 and at a second end to a portion of the housing 302. This may be accomplished by any suitable pivoting connection. In the depicted embodiment, the pivoting connection 312 is provided by keyed posts associated with side walls of the storage bin 308, which pivotally engage cooperating keyed receptacles associated with the linkage 310. Of course, alternative pivoting connections are known in the art and contemplated for use herein. In the depicted embodiment, a pair of linkages 310 are provided, each pivotally connected to opposed walls of the storage bin 308 as described above. However, as will be appreciated fewer or greater numbers of linkages 310 may be included, in accordance with a size dimension and/or a weight of the storage bin 308.

In turn, the pivoting door 304 carries at least one link arm 314 that is fixedly attached at a first end to an interior surface 316 of the pivoting door 304. The link arm 314 is pivotally attached at a second, opposed end to the storage bin 308 by way of a pivoting connection 312. By this described linkage arrangement, the storage bin 308 is configured to deploy by operation of the pivoting door 304, without requiring a fixed connection to either of the door 304 or the housing 302. In the depicted embodiment, a pair of link arms 314 are provided, each pivotally connected to the pivoting door 304 and the storage bin 308 as described above. However, as will be appreciated fewer or greater numbers of link arms 314 may be included, in accordance with a size dimension and/or a weight of the storage bin 308.

Figure 5A:
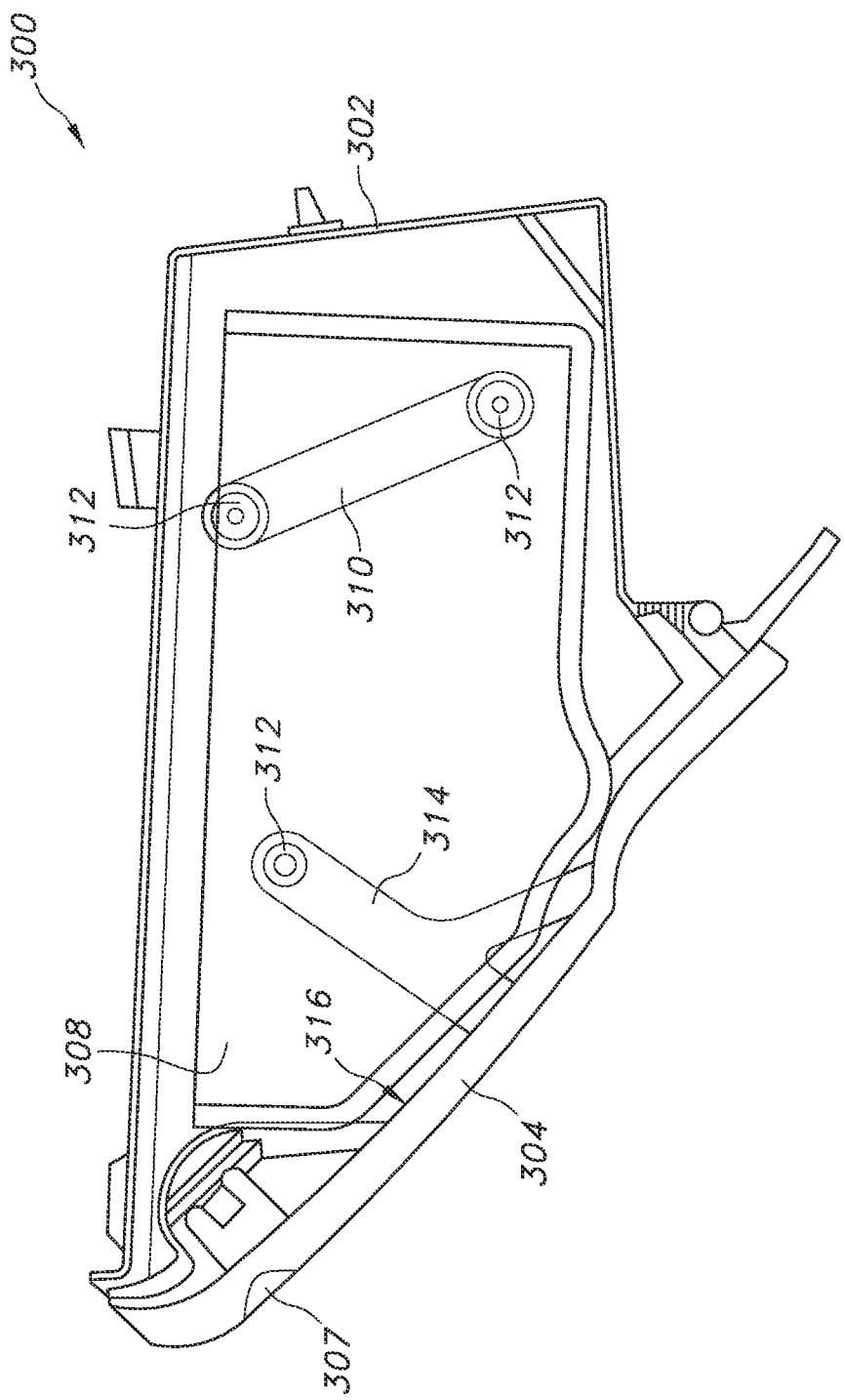
FIG. 5A is a sectional side view of the storage compartment of FIG. 3 in a closed configuration.
Figure 5B:
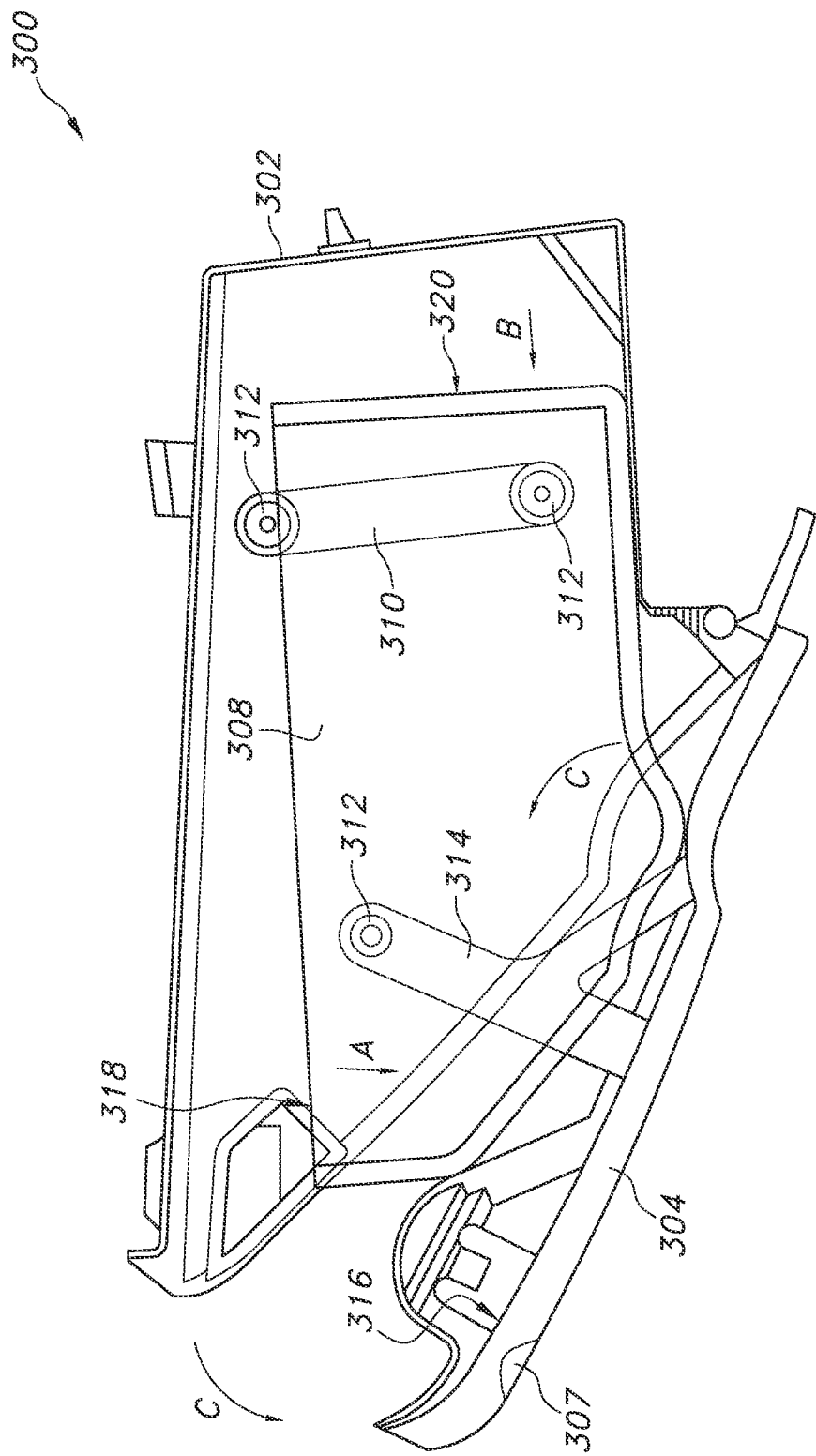
FIG. 5B shows the storage compartment of FIG. 5A deploying to an open configuration.

Advantageously, by this linkage arrangement an improved deployment pattern for the described floating storage bin 308 is achieved. FIG. 5A shows the storage bin 308 in a fully stowed configuration, with the pivoting door 304 in a closed configuration and the storage bin held within an interior of the housing 302. As a user opens the pivoting door 304 (see FIG. 5B), the link arms 314 urge the storage bin 308 in a downward but also a forward direction, that is outwardly from the interior of the housing 302 (see arrows A and B).

Figure 1:
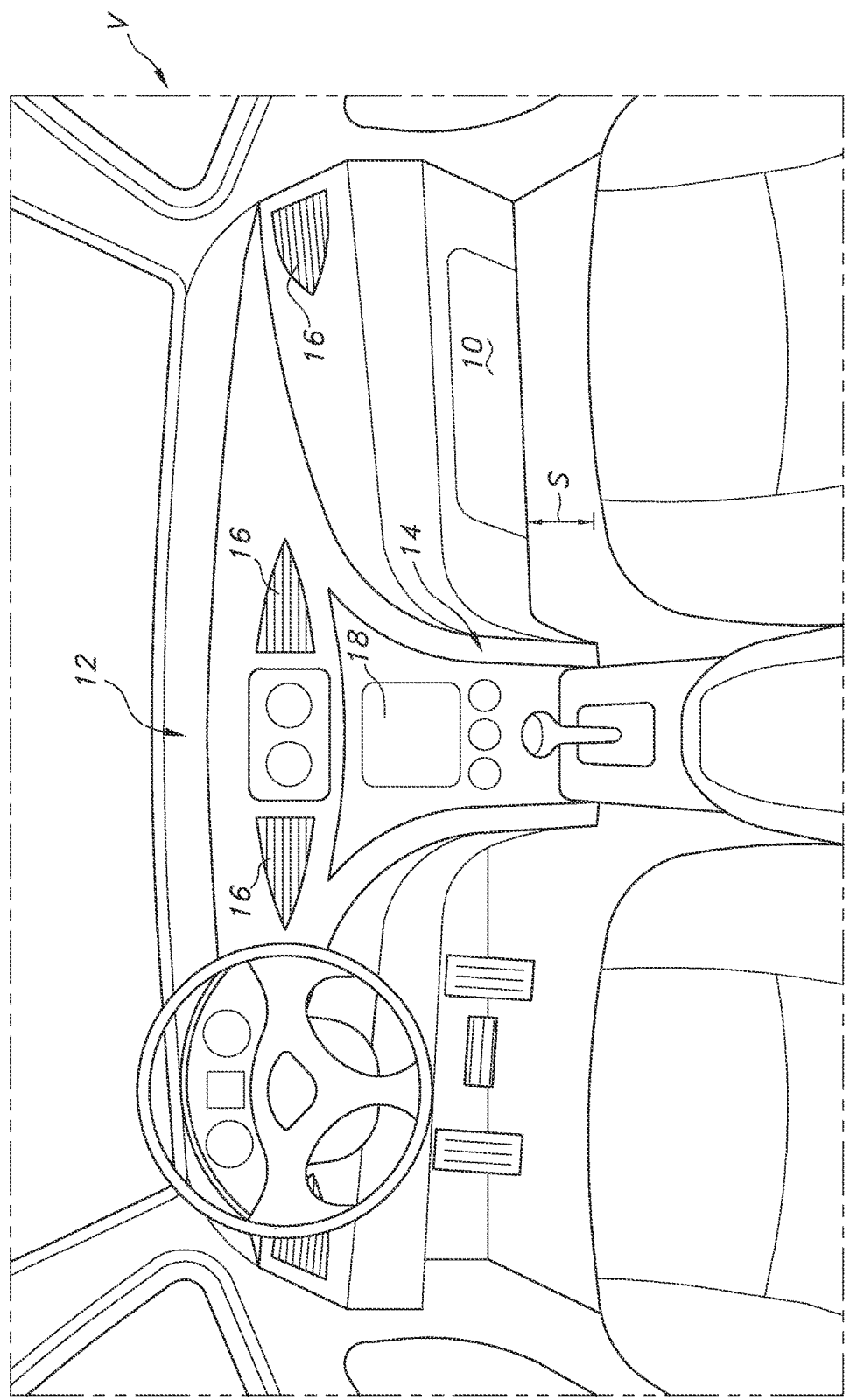
FIG. 1 depicts a prior art vehicle dash panel including a glove box.
Figure 2:
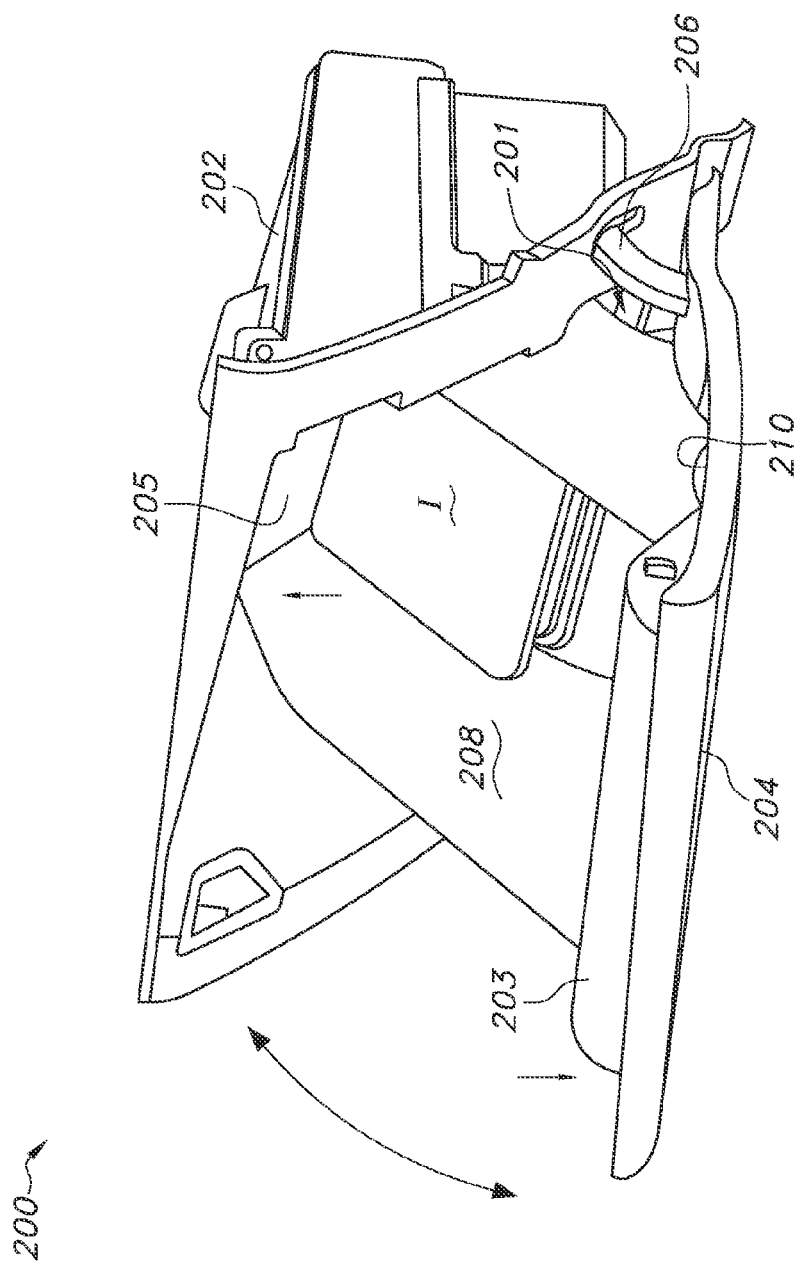
FIG. 2 depicts a prior art glove box including a deployable storage bin.

This deployment pattern is possible by the described pivoting connection between the floating storage bin 308 and the housing 302 that is provided by the linkages 310. As shown, the pivoting door 304 describes a substantially arcuate motion as it is urged towards an open configuration, which is mimicked by the fixedly attached link arms 314 (see arrows C). This urges a forward end 318 of the storage bin 308 downwardly and outwardly from the housing 302. Because the linkages 310 are pivotally connected to both the storage bin 308 and the housing 302, a rearward portion 320 of the floating storage bin 308 is urged forwardly but not downwardly (see arrow B). This contrasts with the primarily downward deployment direction for a storage bin fixed to a glove box door as shown in FIG. 2, wherein the storage bin forward end 203 tilts downwardly and the rearward end 205 tilts upwardly on pivoting the door 204 to an open configuration.

Figure 5C:
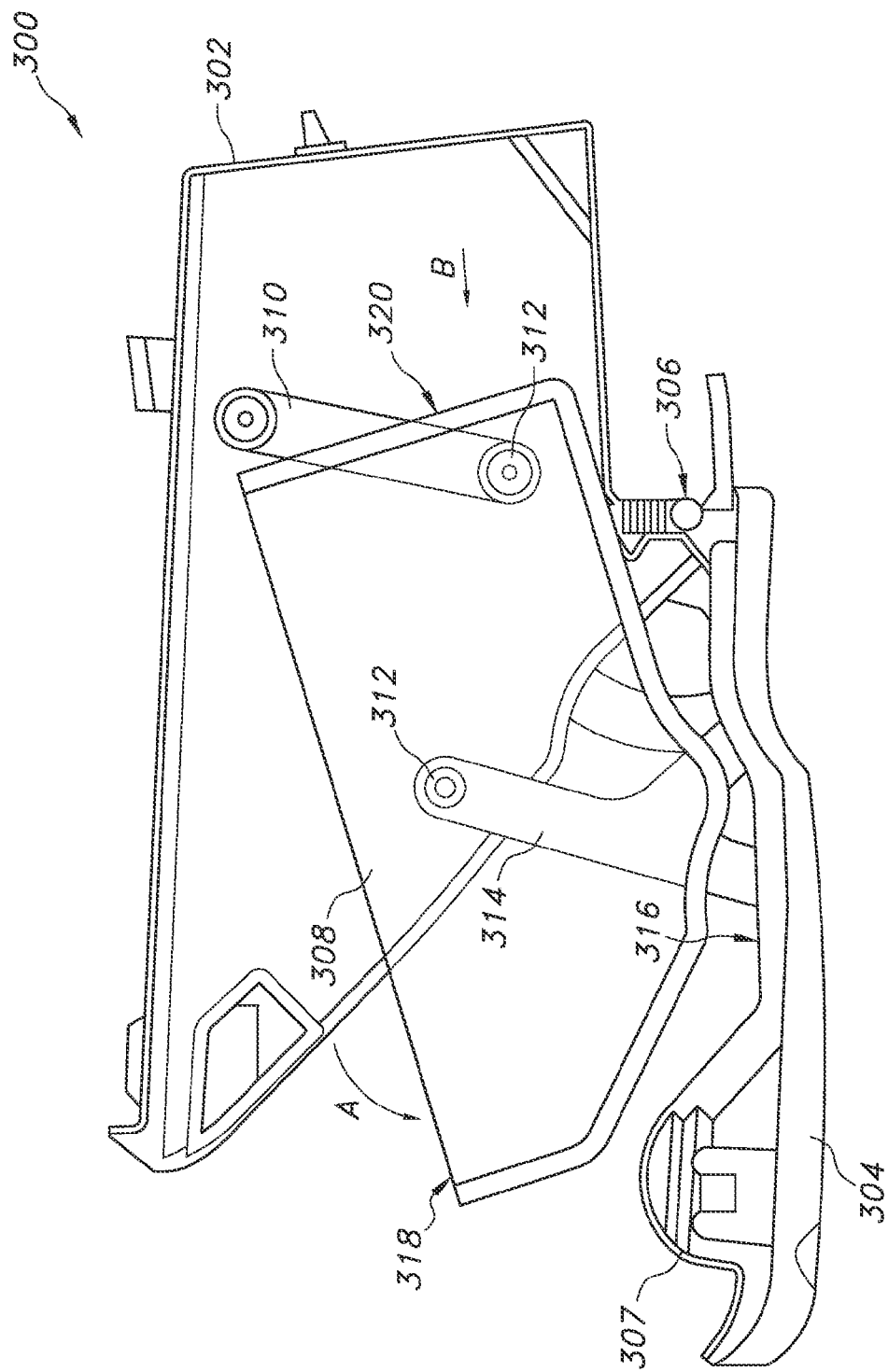
FIG. 5C shows the storage compartment of FIG. 5A in a fully open configuration.

This deployment pattern continues as the pivoting door 304 is translated to the fully open configuration shown in FIG. 5C. As the door reaches the fully opened configuration, the storage bin 308 is deployed outwardly from the housing 302 by the action of link arms 314 and linkages 310 to a greater extent than is the case for the glove box configuration shown in FIG. 2. The benefits of the presently disclosed storage compartment assembly 300 including a floating storage bin 308 are thus readily apparent. While the fully deployed storage bin 308 does retain some forward tilt as shown in FIG. 5C, the deployed storage bin 308 is significantly less angled than is the case for the storage bin of FIG. 2. In turn, by the increased forward deployment of the storage bin 308 significantly more of the interior volume of the bin is accessible and visible to a user positioned at a distance from the bin, for example a driver seated in the vehicle passenger cabin.

Obvious modifications and variations are possible in light of the above teachings. All such modifications and variations are within the scope of the appended claims when interpreted in accordance with the breadth to which they are fairly, legally and equitably entitled.

What is claimed:

1. A vehicle storage compartment assembly, comprising:
   a housing;
   a pivoting door;
   a storage bin pivotally connected to each of the housing and the pivoting door; and
   a linkage arrangement connected at a first end to the housing and at an opposed end to the storage bin, wherein the linkage arrangement includes a pair of linkages each pivotally connected at a first end to the housing and at an opposed end to the storage bin and a link arm arrangement fixedly attached at a first end to the pivoting door and pivotally connected at a second end to the storage bin.

2. The storage compartment assembly of claim 1, wherein the link arm arrangement includes a pair of link arms each fixedly attached at a first end to the pivoting door and each pivotally connected at a second end to the storage bin.

3. A vehicle storage compartment assembly, comprising:
   a housing;
   a pivoting door;
   a floating storage bin pivotally connected to each of the housing and the pivoting door and configured to deploy forwardly from an interior of the housing on translation of the pivoting door from a closed configuration to an open configuration; and
   a linkage arrangement pivotally connected at a first end to the housing and at an opposed end to the storage bin;
   wherein the linkage arrangement includes a pair of linkages each pivotally connected at a first end to the housing and at an opposed end to the storage bin and a link arm arrangement fixedly attached at a first end to the pivoting door and pivotally connected at a second end to the storage bin.

4. The storage compartment assembly of claim 3, wherein the link arm arrangement includes a pair of link arms each fixedly attached at a first end to the pivoting door and each pivotally connected at a second end to the storage bin.

5. A vehicle dash panel glove box assembly, comprising:
   a housing disposed within the dash panel;
   a door hingedly connected to one or both of the housing or the dash panel;
   a floating storage bin pivotally connected to each of the housing and the pivoting door; and
   a linkage arrangement pivotally connected at a first end to the housing and at an opposed end to the storage bin;
   wherein the linkage arrangement includes a pair of linkages each pivotally connected at a first end to the housing and at an opposed end to the storage bin and a link arm arrangement fixedly attached at a first end to the pivoting door and pivotally connected at a second end to the storage bin.

6. The glove box assembly of claim 5, wherein the link arm arrangement includes a pair of link arms each fixedly attached at a first end to the pivoting door and each pivotally connected at a second end to the storage bin.

* * * * *